(12) United States Patent
Davis et al.

(10) Patent No.: US 6,243,087 B1
(45) Date of Patent: *Jun. 5, 2001

(54) TIME-BASED MEDIA PROCESSING SYSTEM

(75) Inventors: Marc Davis, San Francisco; David Levitt, Palo Alto, both of CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/406,923

(22) Filed: Sep. 28, 1999

Related U.S. Application Data (63) Continuation of application No. 08/693,004, filed on Aug. 6, 1996, now Pat. No. 5,969,716.

(51) Int. Cl.$^7$ .............................. G06F 17/00; G06F 3/00; H04N 9/64
(52) U.S. Cl. ......................... 345/328; 345/302; 345/967; 348/598; 348/584
(58) Field of Search .................................. 345/328, 302, 345/327, 967, 349, 356; 386/4, 52, 55, 102, 95; 707/104; 348/575, 700, 598, 584

(56) References Cited

U.S. PATENT DOCUMENTS

| | | | |
|---|---|---|---|
| 4,914,568 | 4/1990 | Kodosky et al. ..................... 345/349 |
| 5,099,422 | 3/1992 | Foresman et al. ........................ 705/1 |
| 5,247,666 | 9/1993 | Buckwold ............................ 707/100 |
| 5,291,587 | 3/1994 | Kodosky et al. ................. 345/333 X |
| 5,301,336 | 4/1994 | Kodosky et al. ..................... 345/348 |
| 5,359,712 | 10/1994 | Cohen et al. ......................... 345/328 |
| 5,388,197 | 2/1995 | Rayner ................................. 345/328 |
| 5,414,808 | 5/1995 | Williams ............................... 345/328 |
| 5,548,340 | 8/1996 | Bertram ................................ 348/559 |
| 5,708,767 | * 1/1998 | Yeo et al. ......................... 345/302 X |
| 5,724,605 | * 3/1998 | Wissner ................................ 345/302 |
| 5,748,956 | * 5/1998 | Lafer et al. .......................... 707/104 |
| 5,781,188 | * 7/1998 | Amiot et al. ......................... 345/328 |
| 5,889,514 | * 3/1999 | Boezemon et al. .................. 345/302 |
| 5,892,506 | * 4/1999 | Hermanson .......................... 345/302 |

FOREIGN PATENT DOCUMENTS

| | | |
|---|---|---|
| 0564247A1 | 10/1993 | (EP) . |
| 0687109A1 | 12/1995 | (EP) . |
| 0706124A1 | 4/1996 | (EP) . |
| WO93/08664 | 4/1993 | (WO) . |
| WO93/21635 | 10/1993 | (WO) . |
| WO94/16443 | 7/1994 | (WO) . |
| WO96/31829 | 10/1996 | (WO) . |

OTHER PUBLICATIONS

"Advance 'bei' Matador", Fernseh–und Kino–Technik, vol. 48, No. 5, May 1, 1994, Heidelberg, DE, pp. 259–260.

(List continued on next page.)

*Primary Examiner*—Raymond J. Bayerl
(74) *Attorney, Agent, or Firm*—Burns, Doane, Swecker & Mathis, L.L.P.

(57) ABSTRACT

Existing media signals are processed to create new media content by defining content representations for the existing media and establishing functional dependencies between the representations. The content representations comprise different data types which determine the kinds of operations that can be performed and dependencies that can be established. Among the types of transformation that can be achieved are synchronization, sound substitution, and the creation of parametric special effects. The content representations and their functional dependencies are combined to construct a functional dependency network which causes the desired transformations to occur on input media signals. The inputs to the functional dependency network are parametrically specified by media data types to construct a template that can be used to create adaptive media productions.

35 Claims, 8 Drawing Sheets

OTHER PUBLICATIONS

Davis, "Media Streams: An Iconic Visual Language for Video Representation", Proceedings of the 1993 Symposium on Visual Languages, pp. 196–220, 1993.

Weitzman et al, "Automatic Presentation of Multimedia Documents Using Relational Grammars", 1994 ACM Proceedings, Multimedia 94, pp. 443–451, Oct. 1994, San Francisco, California.

Adobe After Effects URL:http://www.adobe.com/prodindex/aftereffects/main.html, http://www.adobe.com/prodindex/aftereffects/details.html#features, 1997.

Cinebase URL:http://www.cinesoft.com/info/aboutcinebase/index.html, 1997.

* cited by examiner

TIME-BASED MEDIA PROCESSING SYSTEM

This application is a continuation of application Ser. No. 08/693,004, filed Aug. 6, 1996, now U.S. Pat. No. 5,969,716.

FIELD OF THE INVENTION

The present invention is directed to the production, transformation, modification, resequencing, and distribution of time-based media signals, such as video and audio signals, and more particularly to a media processing system that is capable of providing reconfigurable, adaptive media productions that can accept, adapt, and/or be adapted to new media signals provided by a user, without requiring high levels of skill on the user's part. These processes are directed to, but not limited to, the motion picture, television, music, audio, and on-line content industries.

BACKGROUND OF THE INVENTION

Today's most advanced media processing systems are mechanical, rather than computational, devices. They directly manipulate extents of temporal media in the same manner as the first film editing systems at the dawn of the century, and their users are still required to think that way. In order to understand how even the most advanced media editing systems operate, one can imagine a virtual robot arm manipulating media according to temporal entrance and exit points. A different model of the content being operated upon, and of the operations being performed, could result in different methods of media production and different kinds of media productions. Two historical analogies are illustrative in this connection. The first relates to the invention of manufactured interchangeable parts in the process of gun manufacture in the later part of the 18th century. Before the invention of interchangeable parts, gun manufacture suffered from a lack of standardization and reusability of components. Every part was a unique result of handicraft, rather than a standardized manufactured component. The invention of manufactured interchangeable parts transformed gun production from a pre-industrial to an industrial mode of production. In the later part of the twentieth century, media production methods have yet to achieve the stage of industrialization reached by gun manufacture at the end of the eighteenth century. The current invention aims to alter that situation.

In order for media to be produced by means of the manufacture of interchangeable parts, purely mechanical modes of production are insufficient. Computational media production methods are required, in a manner analogous to the invention in the 1980's of computational production methods in software design which enabled the simple definition, creation, and reuse of software components.

The ability to quickly, simply and iteratively produce new media content is of special interest in contexts where movie-making has been historically hampered by lack of skill and resources. In particular, home consumer production of movie content suffers from the lack of the following three capabilities which are needed to meet these objectives:
  easy-to-use yet powerful composition tools
  access to media content which cannot be produced in the home
  tools for producing high-quality soundtracks (including multitrack music, dialogue, narration, and sound effects)

Another limitation associated with current media processing systems is the fact that they are poorly suited for the re-use of pre-existing media content. This is especially the case in situations in which the cost and/or difficulty of creating new media content exceed the cost and/or difficulty of reusing existing media content. For consumers wishing to participate in media productions, access to existing media is of paramount importance given their lack of production skill, financial resources, and media assets. Currently, there is no mechanism by which pre-existing recordings can be efficiently retrieved and combined to present the desired effect.

In summary, there is a need for a time-based media processing system which is capable of providing high-quality, adaptive media productions without requiring a significant level of skill on the part of the user, and is therefore suited for use by the average consumer. The objective of the invention is to enable new efficiencies, methods, and forms in the production and distribution of media content. The invention also aims to satisfy a need for a media-processing system which facilitates the re-use of media content, and indirectly the labor and expertise that created it.

SUMMARY OF THE INVENTION

In pursuit of these objectives, the present invention embodies a new paradigm for computational media processing which is comprised of two fundamental components:
  Content Representation
  (automatically, semi-automatically, and manually generated descriptive data that represent the content of media signals)
  Functional Dependency
  (functional relationships that operate on content representations and media signals to compute new media content)

The invention combines these two techniques to create time-based media processing systems, which manipulate representations of media content in order to compute new media content. The invention is intended to support a paradigm shift from the direct manipulation of simple temporal representations of media (frames, timecodes, etc.), to the interactive computation of new media from higher level representations of media content and functional dependencies among them. This paradigm of media processing and composition enables the production of traditional media (e.g., movies, television programs, music videos, etc.) to be orders of magnitude faster than current methods. As such, uses of the invention may have fundamental consequences for the current industrial processes of media production, distribution, and reuse. By means of content representation and functional dependency, the current invention creates a production process for computational media components which can determine what they contain, and how they can be processed, adapted, and reused.

In accordance with the present invention, a media signal is processed in a media parser to obtain descriptive representations of its contents. Each content representation is data that provides information about the media signal, and is functionally dependent on the media signal. Depending upon the particular data type of the content representation, different kinds of information can be obtained about the media, and different types of operations can be performed on this information and the media it is functionally dependent upon. Content representations also support inheritance of behavior through directed graph structures (e.g., general to specific) and are composable into new content representations. For example, an audio signal can be parsed to identify its pitch. Higher order parsing can be performed on this content representation to obtain additional information about the media signal, such as its prosody (i.e., its pitch pattern), or in the case of music, its chord structures.

Media parsers may operate automatically, semi-automatically, or manually. Automatic media parsers require no human input in order to produce their content representations from their input media signals. Semi-automatic and manual media parsers require human input or manual annotation to produce their content representations.

The information that is obtained from the content representation of a media signal is fed to a media producer which defines a functional relationship between input media signals and content representations, to produce the new media production. For example, the rate of events of a particular song might be used to control the rate at which a video signal is played, so that events in the video are synchronized with events in the song. Alternatively, a soundtrack can be accelerated, decelerated and/or modified to fit it to a video sequence. In another example, the functional relationship can be used to substitute one item of media for another. For instance, original sounds in a soundtrack for a video signal can be replaced by a new set of sounds having similar properties, e.g. durations, which correspond to those of the original sounds. In another example, events in a video or audio signal can be detected and used to modify one or both media signals in a particular manner to create special effects. In yet another example, specific media signals can be triggered in response to the content of another media signal to, for instance, produce an animation which reacts to the semantic content of an incoming stream of media signal with its dependent content representation.

In the system of the present invention, the generation of a reconfigurable and adaptive media production is carried out in two major phases. In the first phase, a functional dependency network is built by a person referred to herein as a template builder. The functional dependency network provides a functional structure, or template, which outputs the ultimate media production. To this end, a multiplicity of different media parsers and media producers are employed to respectively process different types of media signals and different data types for the content representations. The functional dependency network is built by combining selected ones of the media parsers and media producers in a manner to process media signals and provide a desired functional relationship between them. During the building phase, a fixed set of media signals are input to the functional dependency network, and the template builder can iteratively vary the parsers and producers to obtain a desired result using this constant set of input signals. In addition, new content representations and new data types, can be defined during this phase. Template builders can re-use existing templates in the construction of new ones.

Once the template has been built, one or more inputs to the functional dependency network can be changed from constant input signals to parameters that are defined by their data types. The resulting functional dependency network with parametric input(s) forms an adaptive template that is provided to a template user. In the second phase of the procedure, the template user provides media signals which are of the required data type, to be used as input signals to the functional dependency network. These media signals are processed in accordance with the functions built into the adaptive template to produce a new media production that adapts, and/or adapts to, the template user's input.

In an alternative embodiment of the invention, the constant input signals need not be changed to parameters once the functional dependency network has been defined. In this case, a traditional media presentation, i.e. one which is not adaptive, is obtained. However, the ability to produce and alter the media production in an iterative manner provides a greater degree of efficiency and automation than more traditional methods of media production. In addition, the system permits pre-existing media content to be reused in a meaningful way.

As a further feature of the invention, a visual data flow interface is provided to facilitate the selection, combination and construction of media parsers and producers in the building of the functional dependency network. The manipulation of parsers, producers, functions, media signals, data types, and content representations is effected as the template builder selects, drags and connects their iconic representations in a graphical data flow network. The functionality provided by the interface is analogous to the operation of a spreadsheet, in the sense that the network builder can select and place data items, i.e. media signals, in a particular arrangement, and specify functional dependencies between the data items. The interface displays the input signals, intermediate processing results, and final outputs in both a spatial and a temporal manner, to provide ready comprehension of the relationships of the media signals and the content representations in the functional dependency network. This feature allows the network to be constructed in an intuitive manner.

With the capabilities provided by the present invention, data in any particular medium, or combination of media, undergoes parsing and/or annotation, and subsequent functional combination, to construct a template which can produce new media productions. The new media productions may be produced by other template users each providing their own media, or by the template builder, to make multiple productions with similar structures.

The invention enables consumers to produce movie content with high production values without the traditionally high production costs of training, expertise, and time. The invention also enables the creation of a new type of media production which can adapt, and adapt to, new media input. An example of such an adaptive media production is a music video which can incorporate new video without loss of synchronization, or alternatively adapt its video content to new music. From the viewpoint of consumers who desire to see themselves reflected in movies, videos, and television programs, only simple interactive selection, rather than editing, is required to make or see a media production adapted to and/or adapting their own media content.

These features of the invention, as well as the advantages offered thereby, are explained in greater detail hereinafter with reference to specific examples illustrated in the accompanying drawings.

DETAILED DESCRIPTION

To facilitate an understanding of the principles and features of the present invention, it is described hereinafter with reference to particular examples of media content and processing. In particular, the analysis and transformation of various video and audio streams are described in the context of simple, readily comprehensible implementations of the invention. It will be appreciated, however, that the practical applications of the principles which underlie the invention are not limited to these specific examples. Rather, the invention will find utility in a wide variety of situations and in connection with numerous different types of media and production contexts.

In general, the present invention is directed to the processing and transformation of various types of media signals, to generate new media content. The particular hardware components of a system in which the following principles might be implemented do not form part of the invention itself. However, an exemplary computer system is briefly described herein to provide a thorough understanding of the manner in which the features of the invention cooperate with the components of such a system to produce the desired results.

Figure 1:
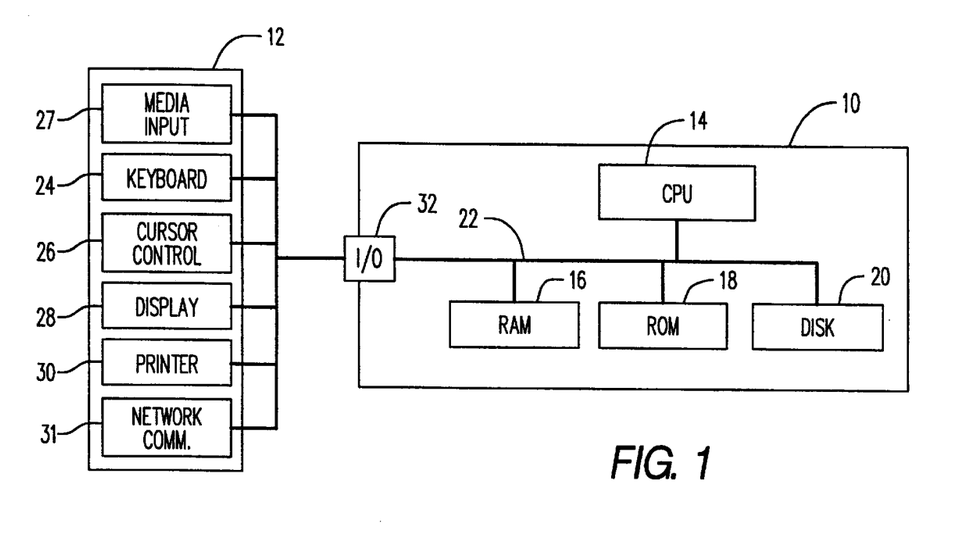
FIG. 1 is a general block diagram of a computer system of the type in which the present invention might be implemented.

Referring to FIG. 1, a computer system includes a computer 10 having a variety of external peripheral devices 12 connected thereto. The computer 10 includes a central processing unit 14 and associated memory. This memory generally includes a main memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. Data pertaining to a variety of media signals can be stored in the permanent storage device 20, and selectively loaded into the RAM 16 as needed for processing.

The peripheral devices 12 include a data entry device such as a keyboard 24, a pointing or cursor control device 26 such as a mouse, trackball, pen or the like, and suitable media input devices 27, such as a microphone and a camera. An A/V display device 28, such as a CRT monitor or an LCD screen, provides a visual display of video and audio information that is being processed within the computer. The display device may also include a set of speakers (not shown) to produce audio sounds generated in the computer. A permanent copy of the media signal can be recorded on a suitable recording mechanism 30, such as a video cassette recorder, or the like. A network communications device 31, such as a modem or a transceiver, provides for communication with other computer systems. Each of these peripheral devices communicates with the CPU 14 by means of one or more input/output ports 32 on the computer.

Figure 2A:
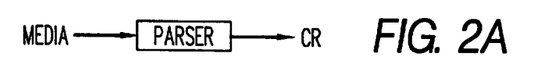
FIGS. 2A–2D are schematic diagrams of the basic operations that are performed in the context of the present invention.

In the processing of media signals in accordance with the present invention, four fundamental types of operations are performed. Referring to FIG. 2A, one type of operation is to parse an original media signal into a content representation of that signal. The original media signal comprises data which defines the content of the signal. In the case of an audio signal, for example, that data comprises individual samples of the amplitude of an audio pressure wave. In the case of a video signal, that data might be the values of the individual pixels that make up the frames of the signal.

In a first order parser, the original media data is processed, or analyzed, to obtain new data which describes one or more attributes of the original data. The new data, and its corresponding type information, is referred to herein as content representation. For instance, in the case of an audio signal, one type of first order parser can produce output data which describes the pitch of the signal. A first order parser for video might indicate each time that the video image switches to a different camera shot. Various types of media signals will have associated forms of content representation. For example, a speech signal could be represented by the individual speech components, e.g., phones, which are uttered by the speaker. In this regard, reference is made to U.S. patent application Ser. No. 08/620,949, filed Mar. 25, 1996, for a detailed discussion of the annotation and transformation of media signals in accordance with speech components. Video signals can likewise be analyzed to provide a number of different forms of content representation. In this regard, reference is made to Davis, "Media Streams: Representing Video for Retrieval and Repurposing", Ph.D. thesis submitted to the Program in Media Arts and Sciences, Massachusetts Institute of Technology, February 1995, particularly at Chapter 4, for a detailed discussion of the content representation of video. The disclosure of this thesis is incorporated herein by reference thereto.

The parsing of a media signal to generate a content representation can be carried out automatically, semi-automatically, or manually. For instance, to manually parse a video signal to identify different camera shots, a human observer can view the video and annotate the frames to identify those in which the camera shot changes. In an automatic approach, each frame can be analyzed to determine its color histogram, and a new shot can be labeled as one in which the histogram changes from one frame to the next by a prespecified threshold value. In a semi-automatic approach, the viewer can manually identify the first few times a new shot occurs, from which the system can determine the appropriate threshold value and thereafter automatically detect the new camera angles.

Figure 2B:
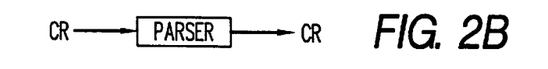

Referring to FIG. 2B, in the second fundamental type of operation, a content representation is processed in a second or higher order parser to generate additional forms of content representation. For example, the pitch content representation of an audio signal can be parsed to indicate properties of its prosody, i.e. whether the pitch is rising or falling. In the case of a video signal, a first order content representation might compute the location of a colored object using the color of pixels in a frame, while a second order parser might calculate the velocity of that object from the first order representation. In another video example, higher order parsing of the shot data can produce content representations which identify scene boundaries in a sequence of shots according to continuity of diegetic (i.e. story) time and location. These types of content representation may depend on aspects of human perception which are not readily computable, and therefore manual and/or semi-automatic annotation might be employed.

Figure 3:
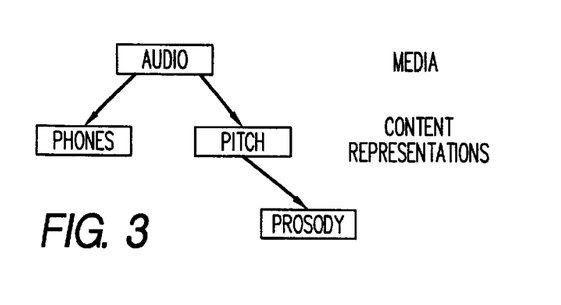
FIG. 3 is a block diagram of the relationships of different types of content representations.

Each different form of content representation employs a data type whose data values are functionally dependent upon the data of the media signal. These data types effectively define a component architecture for all media signals. In this regard, different representations can have a hierarchical or peer-to-peer relationship to one another. Referring to FIG. 3, different content representations produced by first-order parsing of a given media signal have a peer-to-peer relationship. Thus, pitch data and phone data derived from parsing a speech signal are peers of one another. Content representations which are produced by higher order parsers may have a hierarchical relationship to the content representations generated by lower-order parsers, and may have a peer-to-peer relationship to one another. Hence, prosody data is hierarchically dependent on pitch data. The data type inherently defines the types of content representations and media signals that a parser or producer can compute, and in what manner. Based on this information, desired functional dependencies can be established between different content representations and media signals to generate new media content from a template.

Figure 2C:
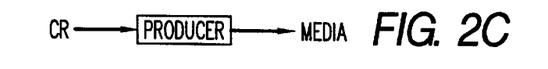
Figure 2D:
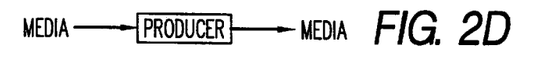

Referring to FIG. 2C, a third type of operation is the processing of content representations to produce a new media signal. In this type of operation, the data of the content representation might be an input parameter to a media producer which causes a media signal to be generated, for example, a synthetic media signal may be rendered from its content representation, such as computer animation parameters or MIDI sequences, respectively. In the fourth type of operation, depicted in FIG. 2D, a media signal is transformed in accordance with a defined media producer to produce new media signals.

These fundamental operations define two basic types of operators that are employed in the present invention. As used herein, a media parser is an operator which produces content representation as its output data, whether the input data is media data, i.e. a first-order parser, or another form of content representation as in second and higher order parsers. A media producer, on the other hand, is an operator which transforms input data to produce a media signal as its output data.

Figure 4:
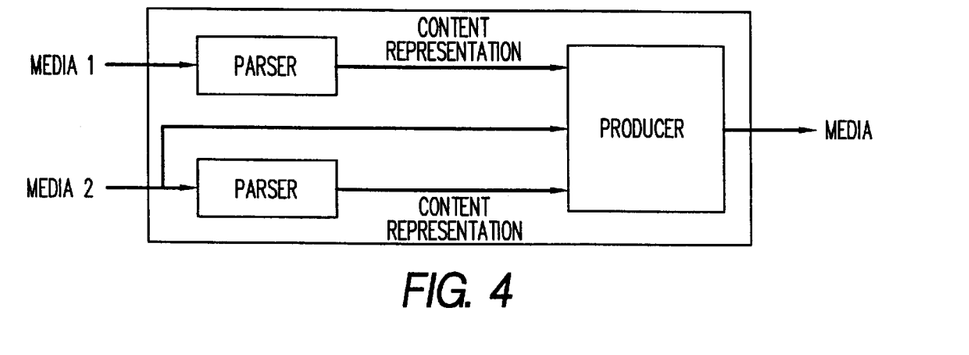
FIG. 4 is a block diagram of a functional dependency network.

In the context of the present invention, these operators are selectively combined to build a functional dependency network. A simple example of a functional dependency network is illustrated in FIG. 4. Referring thereto, the functional dependency network receives one or more media signals as input signals, and parses these input signals to generate content representations for each. The media signals which are input to the functional dependency network could be retrieved from a storage medium, such as the hard disk 20, or they can be real-time signals. The content representations and media signals are processed in a media producer to generate a new media signal. In the context of the present invention, a multitude of different kinds of transformations can be performed on media signals within the functional dependency network. One example of a media transformation includes synchronization, in which the events in one media signal are synchronized with events in another media signal, e.g. by varying their playback rates. Another type of transformation comprises sound substitution, such as foley in traditional motion picture production, in which one type of sound is substituted for another type of sound in an audio/video signal. A third type of processing is the modification of a media signal in accordance with another media signal, to produce parametric special effects. A fourth type of processing is the triggering of a specific media signal in accord with another media signal to, for example, produce a reactive animation to an incoming stream of media signal with its dependent content representation. For example, an animated character may respond to content representations parsed in real-time from live closed-captioned text data. The range of transformations which the system can perform on input media signals is limited only by the range of parsers, producers, functions, and content representation data types definable within the system.

Other types of operations, in addition to parsing and producing, can be carried out in the functional dependency network as well. For example, mathematical, statistical and similar types of scalar operations can be performed on content representations, e.g. increase the pitch of an audio signal by multiplying or adding to the numeric value of its representation. These types of operations are referred to herein as functions. A function is different from a parser in the sense that parser results in a transformation, or change, in the data type between the input and output signals, whereas a function does not alter the inherent data type.

For purposes of the present invention, a data type is defined by a characteristic function that determines whether a particular candidate data is or is not a member of the data type and can be thus transformed by the functional dependency network. The characteristic function takes data and type information as input and returns either True or False to indicate whether that data can be represented as content. For example, the creator of a pitch data type for audio signals might define its operation on "audio with speech with vowel content" or "music with non-percussive content". In some cases the characteristic function may coerce its input to match the expected type for returning True. A builder of robust functional dependency networks preferably designs the data type so that its uses are broad or its limitations are clear.

Data types may be structured in a generalization graph in which behavior is inherited from more general to more specific data types. For example "music" and "vocal sound" are both types of "sound". More specifically, "non-verbal vocal sound" and "verbal vocal sound" are both types of vocal sound. The type-defining characteristic function may itself be constructed as a functional dependency network.

Figure 5:
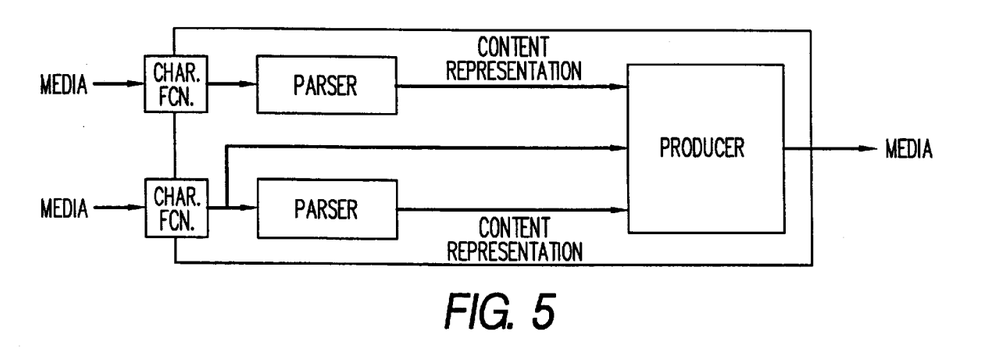
FIG. 5A is a block diagrams of an exemplary template.

Once the functional dependency network has been built to achieve a particular desired result, through the selection and networking of parsers and producers, it forms a template for the generation of a new media production. In one embodiment of the invention, the template is converted into an adaptive template by replacing one or more of its original media input signals with parameters that define particular data types. An example of one type of adaptive template which is created from the functional dependency network of FIG. 4 is shown in FIG. 5. In this example, the original input terminals for the media signals are replaced by media characteristic functions which selectively allow a media signal to be passed on to the parsers in dependence upon whether the media signal is of a particular type. The characteristic function is designed to accept media signals of a particular type, as specified by the template builder. In a very general example, the data type might merely specify that the media signal is video or audio. Depending upon the specific results to be provided by the template, however, the data type parameter for the characteristic function may be more specific, e.g. "video of a person walking on a beach" or "audio of a human-produced percussive sound." If the input media signal is of the specified type, it is passed on to the parser by the characteristic function.

Typically, the template is built by a template builder, who has at least some level of familiarity with the properties and content of media signals, so that the parsers and producers can be combined to effectively produce desired results. Once the template has been built, it can be provided to a template user having almost no familiarity with the particulars of the template and its initial media signals. That user supplies specific media signals which are of the data types specified by the template parameters. These new media signals could be pre-existing, or specifically generated by the template user, e.g. an old home movie or a new digital video recording created to match the types of template input parameters. The new media signals are provided as input signals to the template, to create an appropriately adapted media production.

Figure 6:
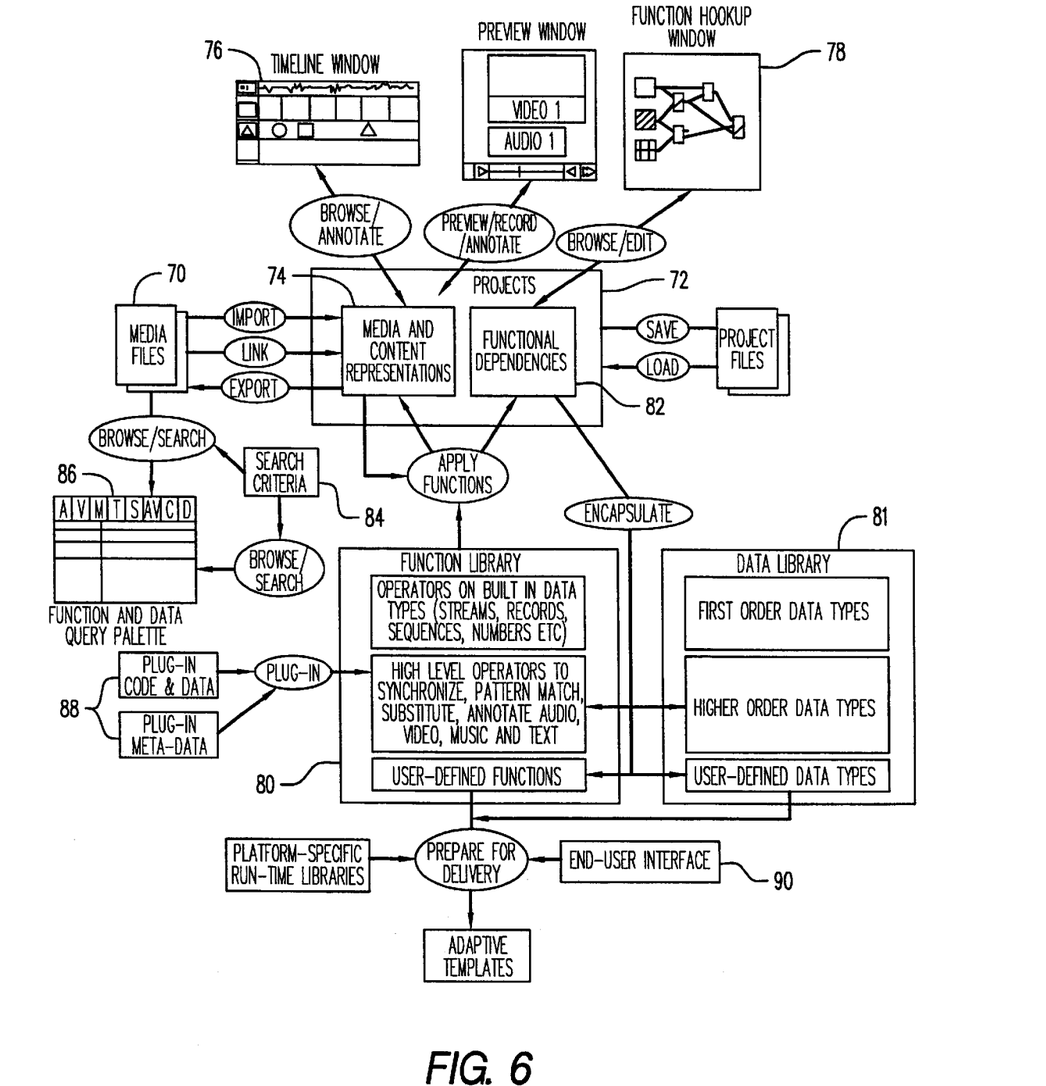
FIG. 6 is a block diagram of the architecture of a system constructed in accordance with the present invention.

The architecture of the system for building media templates is illustrated in block diagram form in FIG. 6. In this figure, elements depicted in ovals represent operations that are carried out, and rectangular objects represent the data that those operations act upon. The media signals which form the original raw data to be processed are stored in various files 70. As noted previously, these files can be located in a permanent storage medium, such as the hard disk 20, accessible to the computer. Alternatively, they can be real-time signals that are input to the system as the functional dependency network is being constructed or used.

Whenever a template is to be built, a project file 72 is created, for example in the random access memory 16 of the computer, and/or on the hard disk 20. The necessary media files for the project are linked into the project file 72. For example, a media file for a video signal, its associated soundtrack, and a file for a song might be linked into the project file 72, from a suitable media folder or directory 74. As the media files are linked into the project file 72, portions thereof can be displayed in a timeline window 76.

Figure 7:
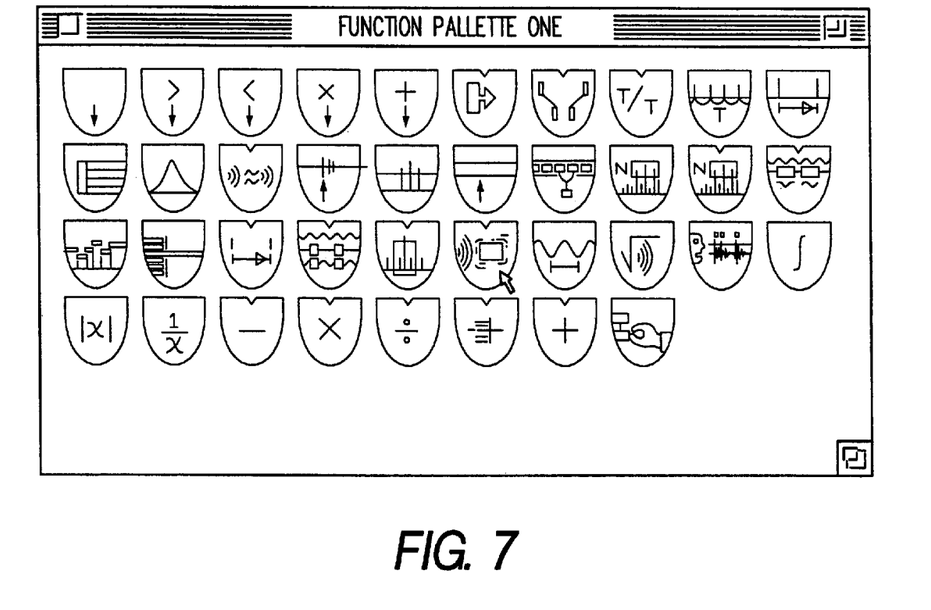
FIG. 7 is an illustration of a function palette.

After an appropriate media file has been linked into the project file 72, either through selection or content-based query, the template builder designates operations that are to be performed on the media data, to generate content representations and establish functional dependencies. As these operations are designated, they are displayed in a function hookup window 78. These functions are obtained from a function library 80, and can be selected from a function palette such as that shown in FIG. 7, or retrieved via a query. Referring to FIG. 7, it illustrates a variety of different operations that can be performed on media signals and content representations, each having an associated icon. When the template builder places the cursor over a particular icon, the name of its corresponding function and the types of media signals and/or content representations upon which it acts are displayed at the bottom of the palette.

The functional dependencies which are defined by the template builder are stored in another folder 82, or similar such data structure, within the project file 72. The result of this procedure is the creation of new media which may be displayed in a timeline window 76. This new media may be stored in the media folder 74, and can be exported to the media files 70 for permanent storage or played in real time. As the project files are completed, they can also be permanently stored on the computer's hard disk 20, or other suitable storage medium.

At this point, a functional dependency network has been created which can produce new media productions based upon the original media input signals. In accordance with one aspect of the invention, information necessary to reproduce this new media production can be electronically transmitted over a shared network to any location with local access to the same media input signals, in a compact form which reduces transmission bandwidth requirements. More particularly, at least some of the original media signals can be distributed to remote locations on the network in any convenient manner, e.g. on compact disk, and stored there for future content generation. Once a new media production has been created, the only data which needs to be transmitted to the remote sites on the network is the data from the project files which describes the appropriate functional relationships between the media signals, as well as pointers to the local and remote media data. If the remote site does not have local access to all of the media data necessary to generate the new media content, that media data which is not already present at the remote site is also transmitted with the project data. From this limited amount of new information, the production can be reproduced at the remote site, without having to transmit it over the network in its entirety.

In accordance with another aspect of the invention, mentioned above, the media production is modified by substituting parameters for the original constant media input signals. These parameters describe types of data which can be substituted for the original media signals. For example, if one of the original media signals was an audio track of a particular human-produced percussive sound such as a hand clap, the data type might specify "a human-produced percussive non-verbal sound." In this case, these data types are stored in a data library 81, from which they are retrieved and supplied to the functional dependency network as the template is being created. Once the functional dependency network has been revised to create an adaptive template, it is prepared for delivery to a template user. As part of this preparation, a different user interface 90 is added to the template which permits the template user to select and/or produce specific media signals to be provided as the media input parameters.

The completed template is then passed on to a template user. In the example described above, the template user supplies a soundtrack of other sounds which satisfy the specified data type, e.g. a kiss, belch, stomp, etc. When the new soundtrack is played back in the context of the template, a media production is produced which has been automatically adapted, and/or adapted to, the template user's input media signals.

Figure 11:
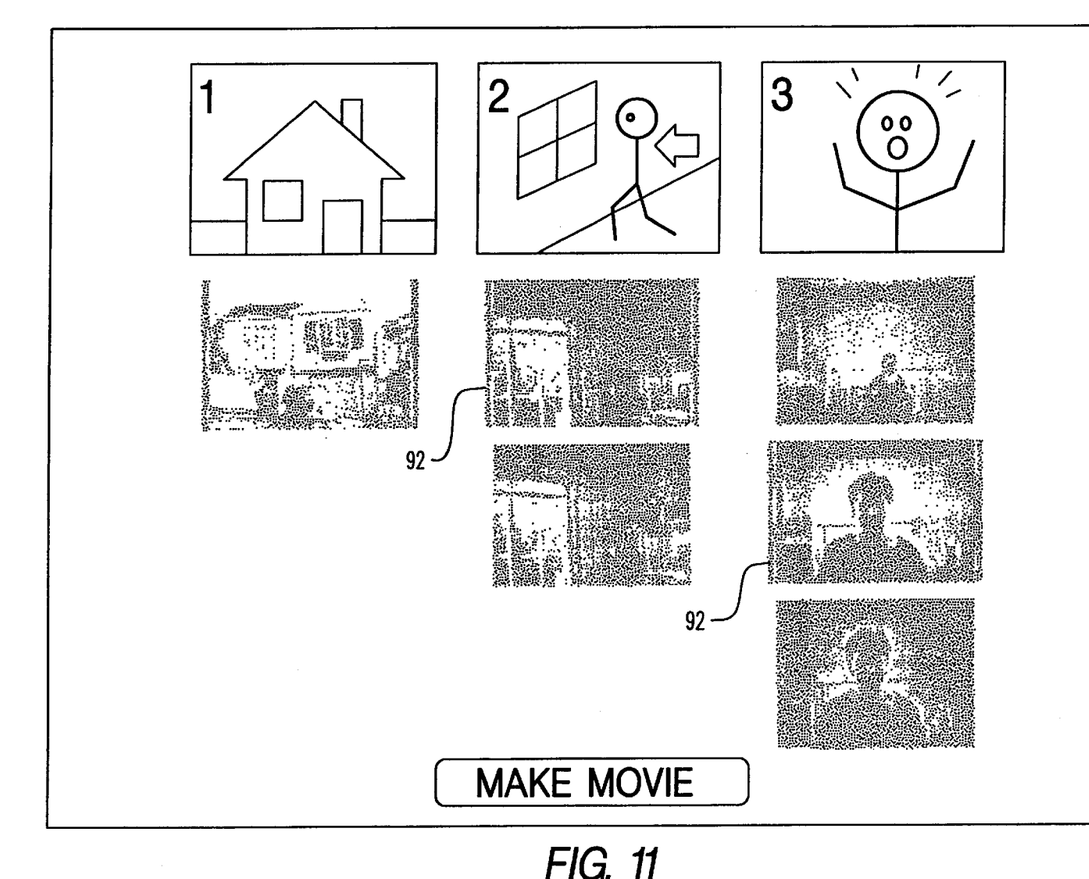
FIG. 11 is an illustration of a user interface for selecting new media signals to produce a new media production from an adaptive template.

A specific example of a template user interface 90 is shown in FIG. 11. Referring thereto, this particular interface specifies three data types which need to be provided by the template user. These data types are indicated in an iconic form. The first data type is a video of the exterior of a residential building. The second data type is a video of a person or persons running to an exterior facing window inside a residential building, and the third data type is a video of a person screaming. When the user provides a new media signal satisfying each data type, it is displayed underneath the iconic representation of the data type, for later selection. For example, one frame of each video example might be displayed. In the illustrated case, the user has supplied one example of the first data type, two examples of the second, and three examples of the third.

When a new media production is to be created, the user selects one example of each data type. The selected example of each data type might be indicated by highlight bars 92, for instance. Once each example has been specified, it is input to the functional dependency network of the adaptive template, namely to the input terminals of the media characteristic functions. The media signals are then transformed in accordance with the relationships established by the functional dependency network, to provide a new adapted media production. The adaptive template transforms the template user's new media signals into a new media production in which the durations, order, and event rates of the new media signals and the original media signals are respectively adapted, and various aspects of the contents of the new media signals and the original media signals are functionally related to produce new media signals. In the depicted example, the new adapted media production presents a mini-monster movie with an accompanying adaptive soundtrack in which a monster approaches a city, the occupants of a residential building run to the window to see the monster destroying the city, the monster's shrieks crossfade into the terrified screams of one of the occupants, and the monster, by means of his footsteps, subsequently shakes, and then destroys the residential building.

Specific embodiments of the construction of a functional dependency network will now be explained. In the first embodiment, one media signal, namely a video signal having an accompanying soundtrack, is synchronized with a second media signal, i.e. a different soundtrack.

One situation in which it may be desirable to perform synchronization between two media signals is where the action occurring in a video is to be tied to a musical score. An example of a video signal which is well suited to this type of transformation is one which has a regularly occurring action that establishes a tempo. The rate at which the video signal is played can be adjusted, so that its timing is coordinated with that of a musical song. Examples of suitable videos include those in which a person or animal is walking, wherein the walker'space establishes the tempo, or one in which some other type of repeated action is being performed, such as playing a game of table tennis, hammering a nail, clapping, or tap dancing. In general, any sequence of discrete events which are detectable can be employed to establish an event rate or tempo, whether they be the same action that is repeated in a cyclic manner, or different events. In the following example, the video to be employed is one which depicts a person chopping an item of food, and therefore a tempo may be computed for it. This video is to be synchronized with specific events in a song, e.g. particular notes on a guitar.

Figure 8:
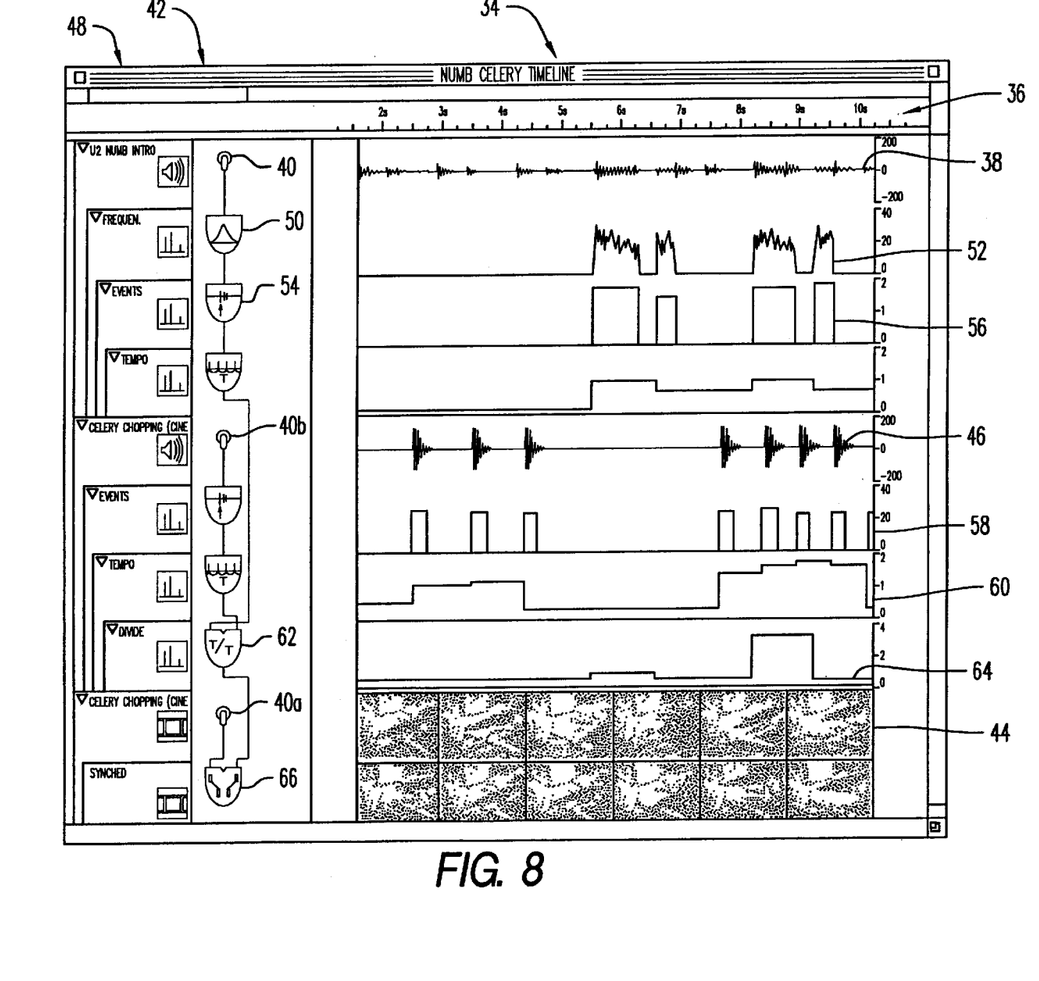
FIG. 8 is an illustration of a user interface for manipulating an audio/video signal to synchronize its events with the events of another audio signal.

FIG. 8 illustrates a graphical user interface that can be presented on the screen of the display 28, to assist the template builder in the construction of the functional dependency network. This user interface consists of a number of different sections, which are arranged in columnar form. In one column 34, the media signals, and content representations of them, are displayed in a timeline format. At the top of this column is a ruler 36. In the example of FIG. 8, the ruler depicts increments of time, e.g. seconds. In practice, any suitable metric can be represented by the ruler, for example the indices of the events in a sequential representation of a media signal. Immediately below the ruler is displayed a media input signal 38, in this case the audio signal for a song, which has been selected by the template builder. The fact that this row of the interface pertains to an original input signal is represented by an iconic tap symbol 40 in an adjacent column 42 of the interface. Two other original media signals are also displayed in the interface, namely selected frames 44 of a video signal, in which a knife is shown chopping a piece of celery, and the accompanying soundtrack 46 for the video. These two input signals are represented by associated taps 40a and 40b in column 42. The displayed events of a data signal in the timeline window 76 need not be linearly sequential. For instance, in a data view of the video signal every 25th frame might be displayed or every frame in which the knife contacts the tabletop.

Another column 48 in the user interface provides the names of media signals and content representations shown in column 34. Thus, the audio input signal is identified in the first row of this column, and the other media input signals are labeled in their corresponding rows. Each description is accompanied by a corresponding icon which depicts the data type of the media signal or content representation.

Once a media signal is selected as an input to the functional dependency network, functions can be selected to be performed upon it to parse it into a suitable content representation. A desired function can be identified by selecting an icon from the function palette shown in FIG. 7, for example. By dragging the icon for the function onto the tap for the signal, or onto the display of the signal itself, the desired operation is performed on the signal. In the example of FIG. 8, the first parsing operation which is performed on the audio signal is to identify a particular frequency range, e.g. notes from a guitar. The parsing operation is identified by an icon 50, and the resulting content representation is shown by the signal 52 in the second row of the user interface. The icon 50 is connected to the tap 40 by a wire, to illustrate their relationship. A second order parsing operation is then performed on this first order content representation, in this case a thresholding operation to detect each new event represented by the signal 52, as depicted by the icon 54 and data signal 56 shown in the next row of the interface. This data is further operated upon to identify the event rate of the guitar notes, as shown in the fourth row of the interface.

In a similar manner, the audio signal 46 for the soundtrack undergoes two levels of parsing to identify events, in this case the chops of the knife, and their varying event rate, as shown in rows 58 and 60 of the interface, respectively.

Once the event rates of the two audio signals have been identified, their relative rates are computed. This is carried out by dividing the guitar event rate by the chop event rate for all times during the signals, as represented by the icon 62. The result of this operation is illustrated as the content representation 64. This data signal represents a dynamic tempo factor which, when applied to the chop audio signal 46, and the corresponding video signal 44, causes their event times to match those of the guitar events. In this case, the rate of the video signal is modified, as indicated by the apply tempo icon 66, so that the chopping action matches the guitar note events of the song. Alternatively, the reciprocal of this dynamic tempo factor can be computed and applied to the song, so that the guitar parts match the chopping events in the video.

It can be seen that the graphical user interface of FIG. 8 provides a tool by which the template builder can construct a functional dependency network in a manner analogous to the operation of a spreadsheet. Data views as shown in column 34 contain the results of operations performed on this data, in a manner analogous to mathematical and statistical operations performed on the numbers in a spreadsheet. The results of the operations can be displayed both spatially, in the data views, and temporally, in a preview window (not shown) in which the media is played back. Thus, the user is provided with an intuitive mechanism for carrying out various transformations on media signals, and immediately observing the results of those transformations. Furthermore, by displaying the results in a preview window, the template builder can immediately view the effect of each new combination of parsers and producers as they are connected, and change them as desired, thereby providing an iterative approach to the construction of the template. The ability to easily alter the structure of the functional dependency network as well as change its media input signals also contributes to the efficiency of media processing within the system.

In addition to the synchronization of two media signals as depicted in the preceding example, the features of the present invention can be employed to achieve other effects. One such effect is the substitution of one sound for another. In movie signals, it is sometimes desirable to enhance certain sound effects by substituting one sound for another. For example, a scene may depict a horse walking on a hard surface, such as a cobblestone street. One known technique for augmenting the sound of the horse's hooves hitting the stones is to clap a hard object, such as a coconut shell, against a table or other solid surface. By substituting the sounds of the coconut shell for the originally recorded sounds of the horse's hooves, an enhanced impression is created of the horse walking on the street. This technique of substituting one sound for another is known as "foley" in traditional motion picture production.

The present invention provides a mechanism by which operations such as foley can be easily implemented. Such an application of the invention will be described with reference to the example illustrated in FIG. 9. In this example, one of the media signals is a video of two opponents in a karate match, shown in data view 100 of the template builder's interface. The accompanying soundtrack 102 for the video appears in the top data view. The objective of the transformation to be carried out in this example is to substitute a new sound for the sound of each punch and kick in the original media To do so, the soundtrack 102 is parsed to obtain a first order content representation which indicates each time a punch or kick sound appears. In this particular example, these sounds are the loudest in the soundtrack, and they are detected through a thresholding operation. Each time the amplitude of the soundtrack signal 102 exceeds the threshold, the duration of the corresponding sound is also detected, i.e. the length of time the sound remains above the threshold. This type of processing is identified by the event detector icon 104, and results in a content representation as shown at 106. This content representation contains an event each time a sound above the threshold is detected. The width of the event corresponds to the duration of the detected sound, and its height indicates the average amplitude of the sound over that interval.

Figure 9:
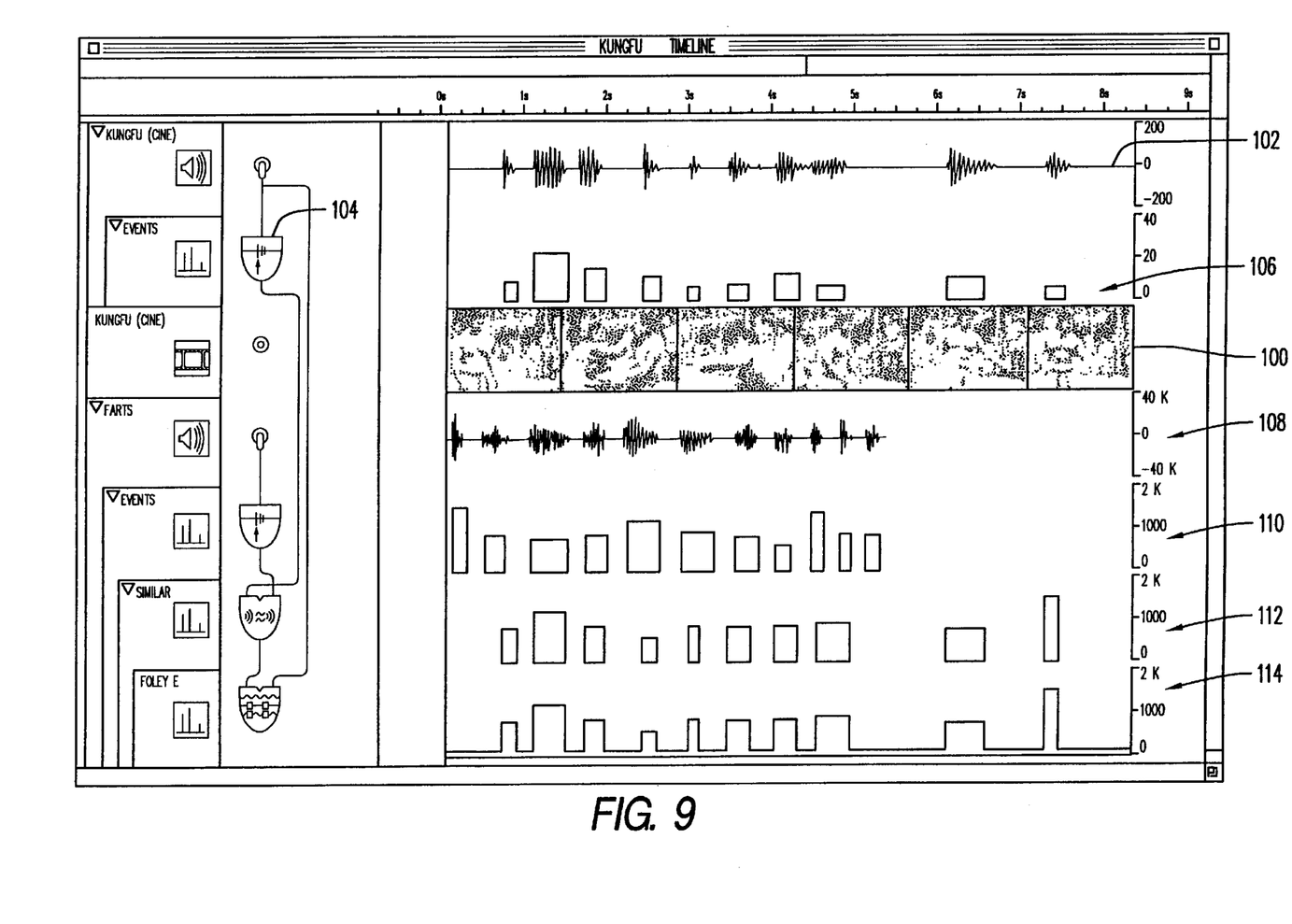
FIG. 9 is an illustration of a user interface for manipulating an audio/video signal to substitute new sounds.

The second media signal 108 comprises an audio recording of sounds to be substituted for the sounds of the punches and kicks. For example, the recording could be of one or more human-produced, non-verbal percussive sounds, such as a kiss, belch, flatulence, clap, finger-snap, etc. The recording could be of the same sound produced several different times, or different discrete sounds. This recording is similarly parsed by the event detection process, to produce another content representation 110 of sound events. In effect these events and the accompanying recorded sounds 108 constitute an annotated database of discrete sounds having different properties such as amplitude, frequency, and duration. Individual sounds in this database are then matched to the detected events in the original soundtrack 102. More particularly, the duration of each event in the content representation 106 is determined, and a sound from the database 108 having the same duration, or one with the closest duration, is selected. Data view 112 illustrates the sounds from the database which have been matched with those of the original soundtrack 102. The final result is depicted in the data view 114. In the transformed media signal, the background portion of the original soundtrack is played in the normal manner along with the video. However, each time one of the detected events occurs, as indicated by the data view 106, the original sound is replaced by the corresponding sound from the sound database 108. Thus, each time a punch or kick occurs in the video, it is replaced by a human-produced sound, e.g. a belch.

Figure 10:
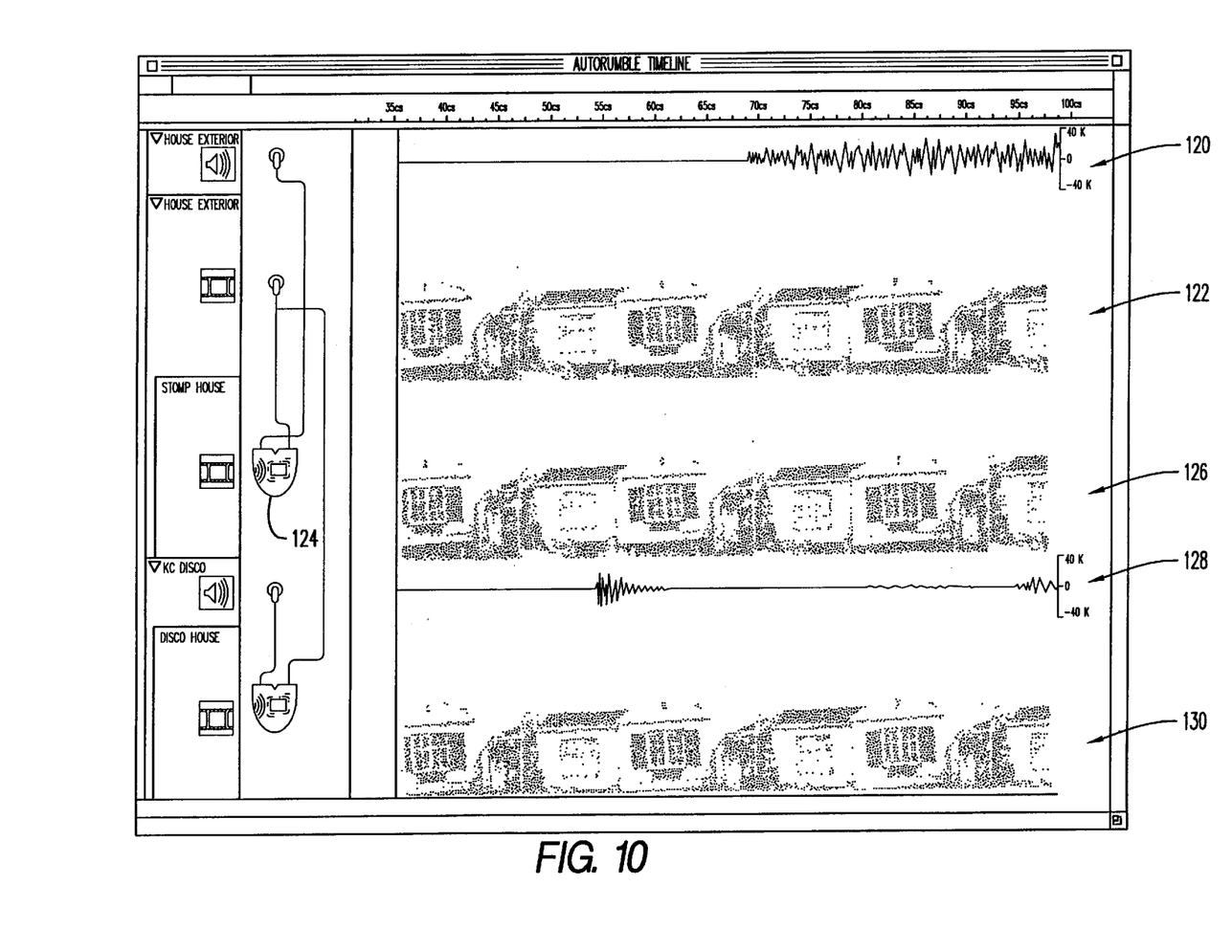
FIG. 10 is an illustration of a user interface for manipulating a video signal to create an auto rumble effect.

In another application of the invention, the functional relationships based upon content representation can be used to create parametric special effects. For example, in a video which depicts a giant or monster walking through a town, it may be desirable to have objects shake each time the monster takes a step, to create the impression of tremors resulting from the monster's footsteps. Examples of this application of the invention are illustrated in FIG. 10. The first input signal 120 in this example is a soundtrack from a monster movie. In this particular example, it is assumed that a loud sound accompanies each footstep. The high-amplitude portions, of the signal, such as the portion visible at the right side of FIG. 10, represent the loud foot stomps made by the monster. The second input signal 122 is a video shot of the exterior of a residential building, in this instance, a house. These two media signals are fed as input signals to a function that is referred herein as an "auto rumbler," which is represented by the icon 124. This function accepts one audio signal and one video signal as its inputs, and shakes the video image in response to the audio input, as represented at 126. The shaking of the video image can be accomplished by introducing functionally dependent vertical and/or horizontal shifting of the video image. To avoid blank areas in the image which result from translating the frame, as well as to enhance the visual effect, the image is also zoomed as it is shifted. In a preferred embodiment, the amount of the shift and the magnitude of the zooming are proportional to the amplitude of the sound which triggers the shaking. Thus, as the loudness of the sound increases, the scene shakes more. If desired, a lower limit can be put on the amplitude of the sounds which cause the shaking of the image to occur. Thus, the shaking will be selective, and only be visible when loud sounds are made, such as the monster's footsteps.

In a more complex implementation of this example, it may be desirable to depict the tremors in certain scenes, for example those within the interior of a house, but not other scenes, such as views of the monster from a distance. In this case, the video signal can be parsed to generate content representation which describes various types of scenes in the video. This information can be used to selectively control the shaking of the video image, so that it only occurs during the desired scenes. Similarly, content representation can be used to determine which video or audio layer of a media production is modified.

The bottom portion of FIG. 10 illustrates a second embodiment of this application. In this case, the audio input signal 128 is a song, preferably one having a distinctive beat, e.g. a disco song. The auto rumbler causes the video image, which in this case is of the same house, to shake in proportion to the amplitude of the song. The modified video image is represented at 130 in the interface. Thus, the house vibrates in accordance with the song, giving the impression that the music is being played very loudly inside the house.

As noted previously, graphical user interfaces such as those illustrated in FIGS. 8–10 permit the template builder to act upon the media data in a manner analogous to the operation of a spreadsheet. Specifically, the template builder can select certain data i.e., a media signal, and specify operations that are to be performed upon it and functional dependencies between different sets of data. The use of content representations to provide information about the media signals provides the template builder with a suitable mechanism for searching and locating specific desired media signals. In this context, the system of the present invention also provides capabilities that are analogous to functions of a database. Referring to FIG. 6, the template builder can specify certain search criteria 84, which might be entered through a query palette 86 presented on the display device 28. The search criteria may act directly upon the content representations stored in the media files 70 in response to queries entered by the template builder, for example, to locate all songs containing a particular harmonic cadence in a chord sequence, or, for example, all videos which include an adult figure locomoting from right to left. The results of the search can be displayed in the query palette. Alternatively, or in addition, functional operators can be employed as part of the query criteria to search for higher order content representations in a database of lower order content representations.

The function library 80 might initially contain various kinds of operations that can be performed on known data types. As additional data types are created, specific functions which can operate on these data types, as well as new or updated functions for pre-existing data types, can be added by way of various plug-in modules 88, or through the composition and encapsulation of existing parsers, functions, and producers in a functional dependency network.

From the foregoing, it can be appreciated that the present invention provides a system which enables users having relatively low levels of skill to easily create new media content. The operation of the system is based upon the use of content representations for the media signals of interest, and the establishment of functional dependencies between those representations and media signals. Furthermore, by presenting graphical user interfaces which enable the template builder to establish the functional dependencies in a manner analogous to the operation of a spreadsheet, a more intuitive approach to the transformation of media is provided. The adaptive templates constructed by template builders also allow template users to create new media productions incorporating new media signals without requiring any skill in media processing or production.

It will be appreciated by those of ordinary skill in the art that the present invention can be embodied in other forms without departing from the essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed:

1. A method for producing new media productions from existing media signals, comprising the steps of:

parsing a media signal to produce a representation of the content of the media signal in a format corresponding to one of a multiplicity of predefined data types for content representations;

defining a functional relationship between said content representation and another data signal; and modifying said media signal in accordance with said functional relationship to thereby generate a new media production.

2. The method of claim 1 wherein said data signal is a content representation of a second media signal.

3. The method of claim 1 wherein said content representation comprises a component of the media signal which corresponds to said data type for that content representation.

4. The method of claim 3 wherein said modifying step results in a manipulation of said component.

5. The method of claim 3 wherein said modifying step comprises the substitution of the same component of a second media signal for said component of the original media signal.

6. The method of claim 1 wherein said modifying step comprises changing the temporal scale of said media signal.

7. The method of claim 1 wherein said modifying step comprises replacement of a content element of said media signal with a substitute element of content.

8. The method of claim 7 wherein said content element is a sound, and the substitute element has the same temporal duration as the element being replaced.

9. The method of claim 1 wherein said modifying step comprises alteration of at least one parameter of a video image.

10. The method of claim 9 wherein said alteration comprises translation of the video image.

11. The method of claim 9 wherein said alteration comprises zooming of the video image.

12. The method of claim 9 wherein said other data signal is an audio signal, and said alteration is carried out in synchronism with sounds in said audio signal.

13. A method for producing adaptive media productions from existing media signals, comprising the steps of:

parsing original media signals to generate content representations of the media signals which identify properties of the signals;

creating a functional dependency network of parsers, functions, and producers of media signals and content representations;

designating one or more input media signals to the functional dependency network as typed data parameters, to form a template for the generation of a media production;

providing a new media signal which corresponds to a data type for one of the template inputs;

executing the functions in the functional dependency network, to modify the original media signals to adapt them to the new media signals, and/or modify the new media signals to adapt them to the original media signals; and outputting a resulting media production from the template.

14. A system for generating adaptive media content, comprising:

a multiplicity of media parsers for processing media signals to provide different respective representations of the content of media signals;

a multiplicity of media producers for processing said content representations and media signals in accordance with respective functions to produce media signals;

means for selectively combining individual ones of said media parsers and said media producers to generate a functional dependency network which defines functional dependencies between different content representations of media signals and media signals to generate a new media signal; and means for creating a template having parametric data type specifications for input signals to said functional dependency network.

15. An adaptive template for the creation of adaptive media productions, comprising:

a functional dependency network which includes media parsers and media producers connected to one another to produce a predetermined transformation to a media signal based on the content of at least one other media signal; and a media characteristic function which designates a parametric data type for a media signal and which passes media signals of the designated data type to said functional dependency network to cause a media production to be generated which includes media signals of the designated type.

16. The adaptive template of claim 1 wherein said functional dependency network transforms components of a media signal corresponding to said designated data type to produce a new media signal.

17. The adaptive template of claim 16 wherein the manner in which the media parsers and media producers are connected to one another in said functional dependency network defines the transformations that take place on the components of the media signal.

18. A user interface for the creation of media content, comprising:

a first column in which at least selected portions of media signals and content representations are displayed in a spatial manner:

means for displaying selectable operations that can be performed on displayed media signals and content representations;

a second column graphically indicating operations that have been selected and spatially indicating the interrelationships of the operations; and means for displaying the results of said operations in said first column in a spatial manner corresponding to the spatial display of the media signals from which said results are derived.

19. The user interface of claim 18 wherein said first and second columns are contained within a common window.

20. The user interface of claim 18 wherein a media signal is displayed in a first row of said first column, and a content representation of said media signal is displayed in a second row of said first column, in alignment with said media signal.

21. The user interface of claim 20 wherein an operation that is performed on said media signal to generate said content representation is graphically indicated in said second column at a position corresponding to said second row.

22. The user interface of claim 20 wherein multiple media signals are displayed in respective rows of said first column and at least one content representation for each of said media signals is displayed in said first column, in a corresponding respective row.

23. The user interface of claim 22 wherein one of said selected operations is based upon at least two content representations for different respective media signals, and the result of such operation is displayed in a corresponding row of said first column.

24. The user interface of claim 18 further including means for displaying the results of said operations in a temporal manner.

25. A method for remotely producing a media production from existing media signals, comprising the steps of:

parsing original media signals at a first site to generate content representations of the media signals which identify properties of the signals;

creating a template comprising a functional dependency network of parsers, functions, and producers of media signals and content representations at said first site;

storing at least some of said original media signals at a second site remote from said first site;

transmitting said template and identifiers of said original media signals to said second site;

executing the functions in the functional dependency of said template in connection with the original media signals stored at said second site to produce a media production at said second site.

26. The method of claim 25 wherein at least some of the original media signals input to said functional dependency network are not stored at said second site, and further including the step of transmitting with the template only those original media signals which are not stored at said second site.

27. A system for generating a media production from existing media signals, comprising:

a multiplicity of media parsers for processing media signals to provide different respective representations of the content of media signals;

a multiplicity of media producers for processing said content representations and media signals in accordance with respective functions to produce media signals;

means for selectively combining individual ones of said media parsers and said media producers to generate a functional dependency network which defines functional dependencies between different content representations of media signals and media signals to generate a new media signal; and means displaying transformations performed on existing media signals input to said functional dependency network.

28. A method for remotely producing a media production from existing media signals, comprising the steps of:

creating a template comprising a functional dependency network of parsers, functions, and producers of media signals and content representations at a first site;

storing at least one original media signal at a second site remote from said first site;

transmitting said template to said second site;

executing the functions in the functional dependency network of said template to transform components of the original media signal stored at said second site to generate a media production at said second site.

29. A computer-readable medium containing a program which executes the following steps:

parsing a media signal to produce a representation of the content of the media signal in a format corresponding to one of a multiplicity of predefined data types for content representations;

defining a functional relationship between said content representation and another data signal; and modifying said media signal in accordance with said functional relationship to thereby generate a new media production.

30. A computer-readable medium containing a program which executes the following steps:

parsing original media signals to generate content representations of the media signals which identify properties of the signals;

storing a functional dependency network of parsers, functions, and producers of media signals and content representations;

forming a template for the generation of a media production, comprising one or more input media signals to the functional dependency network;

receiving a new media signal which corresponds to a data type for one of the template inputs;

executing the functions in the functional dependency network, to modify the original media signals to adapt them to the new media signals, and/or modify the new media signals to the adapt them to the original media signals; and outputting a resulting media production from the template.

31. A user interface for the creation of media content, comprising:

a first area in which at least selected portions of media signals and content representations are displayed;

a second area in which operations on media signals and content representations that have been selected by a user, and the interrelationships of said operations, are graphically displayed; and a third area in which the results of performing said operations on the media signals are displayed.

32. The user interface of claim 31 wherein said first and third areas are contained within a common window.

33. The user interface of claim 31 wherein said first and third areas are contained within a common frame in a window.

34. The user interface of claim 33 wherein said second area is contained within a second frame in said window.

35. A system for generating a media production from existing media signals, comprising:

a multiplicity of media parsers for processing media signals to provide different respective representations of the content of media signals;

at least one media producer for processing said content representations and media signals in accordance with respective functions to produce media signals; and means for selectively combining individual ones of said media parsers and said media producer to generate a functional dependency network which defines functional dependencies between different content representations of media signals to generate a new media signal.

* * * * *